(12) United States Patent
Landmark

(10) Patent No.: US 8,509,685 B2
(45) Date of Patent: Aug. 13, 2013

(54) SYSTEMS AND METHODS FOR MANAGING POWER CONSUMPTION OF A TRANSCEIVER

(75) Inventor: Joakim Landmark, Phoenix, AZ (US)

(73) Assignee: CSR Technology, Inc., Sunnyvale, CA (US)

( * ) Notice: Subject to any disclaimer, the term of this patent is extended or adjusted under 35 U.S.C. 154(b) by 157 days.

(21) Appl. No.: 12/433,147

(22) Filed: Apr. 30, 2009

(65) Prior Publication Data

US 2010/0279744 A1   Nov. 4, 2010

(51) Int. Cl.
*H04B 7/00* (2006.01)
*H04B 1/38* (2006.01)

(52) U.S. Cl.
USPC .......................................... 455/41.2; 455/574

(58) Field of Classification Search
USPC .......................................... 455/130; 345/169
See application file for complete search history.

(56) References Cited

U.S. PATENT DOCUMENTS

| | | | |
|---|---|---|---|
| 2003/0197488 A1 | 10/2003 | Hulvey | |
| 2006/0128308 A1* | 6/2006 | Michael et al. | 455/41.2 |
| 2008/0076364 A1* | 3/2008 | Hall | 455/127.1 |
| 2008/0181337 A1* | 7/2008 | Maxim | 375/340 |
| 2009/0061770 A1* | 3/2009 | Agardh | 455/41.2 |
| 2010/0093279 A1* | 4/2010 | Linsky et al. | 455/41.2 |

FOREIGN PATENT DOCUMENTS

GB   2384944   6/2003

OTHER PUBLICATIONS

Bluetooth Specification Version 2.1 +EDR, Specification of the Bluetooth System, pp. 1-74, vol. 0, Jul. 26, 2007.

* cited by examiner

*Primary Examiner* — Tuan T Lam
(74) *Attorney, Agent, or Firm* — Minh N. Nguyen, Esq.; Next IP Law Group LLP

(57) ABSTRACT

Systems and methods for managing power consumption of a transceiver, e.g., Bluetooth, are provided. A representative transceiver includes an antenna that receives analog radio frequency (RF) signals, and a RF analog circuitry that receives and processes the analog RF signals from the antenna. An analog-to-digital converter (ADC) receives and converts the processed analog RF signals to digital RF signals. A digital circuitry includes a RF power detector that receives the digital RF signals and determines a RF power of the analog RF signals from the antenna based on the digital RF signals. A computing device instructs the RF analog circuitry to operate in low current drain RF receiver mode during page scanning and/or inquiry scanning. The computing device is designed to receive the RF power of the received analog RF signals and manages the power consumption of the transceiver based on the RF power.

18 Claims, 6 Drawing Sheets

US 8,509,685 B2

SYSTEMS AND METHODS FOR MANAGING POWER CONSUMPTION OF A TRANSCEIVER

TECHNICAL FIELD

The present disclosure is generally related to transceivers and, more particularly, is related to systems and methods for managing power consumption of a transceiver, e.g., Bluetooth.

BACKGROUND

Unconnected Bluetooth devices can be in two different modes page scan mode and/or inquiry scan mode. In page scan mode, the Bluetooth device listen for page messages, i.e. requests to establish a connection between the Bluetooth device and the target devices. This is done by periodically operating a receiver of the Bluetooth device and listening for a page message according to the standardized paging procedure in Bluetooth.

The inquiry scan mode is a procedure where the Bluetooth device listens for inquiry messages, i.e. requests for the address of neighboring devices. The address is a prerequisite for the paging procedure and inquiry is needed if the address is not available by other means. This is done by periodically operating a receiver of the Bluetooth device and receiving an inquiry message from the target devices. The target device listens for an inquiry reply according to the standardized inquiry procedure in Bluetooth. The Bluetooth device then goes into the page scan mode to establish connection between the Bluetooth device and the target device. In both the page and inquiry scan modes, the Bluetooth device can repeatedly perform the functions mentioned above if there are no active connections established; thus, power consumption in both modes can waste battery life.

SUMMARY

Systems and methods for managing power consumption of a transceiver, e.g., Bluetooth, are provided. A representative transceiver includes an antenna that receives analog radio frequency (RF) signals, and a RF analog circuitry that receives and processes the analog RF signals from the antenna. An analog-to-digital converter (ADC) receives and converts the processed analog RF signals to digital RF signals. A digital circuitry includes a RF power detector that receives the digital RF signals and determines a RF power of the analog RF signals from the antenna based on the digital RF signals. A computing device instructs the RF analog circuitry to operate in low current drain RF receiver mode during page scanning and/or inquiry scanning. The computing device is designed to receive the RF power of the received analog RF signals and manages the power consumption of the transceiver based on the RF power.

Other systems, devices, methods, features of the invention will be or will become apparent to one skilled in the art upon examination of the following figures and detailed description. It is intended that all such systems, devices, methods, and features be included within the scope of the invention, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, the reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which power consumption of a transceiver can be managed.

Figure 1:
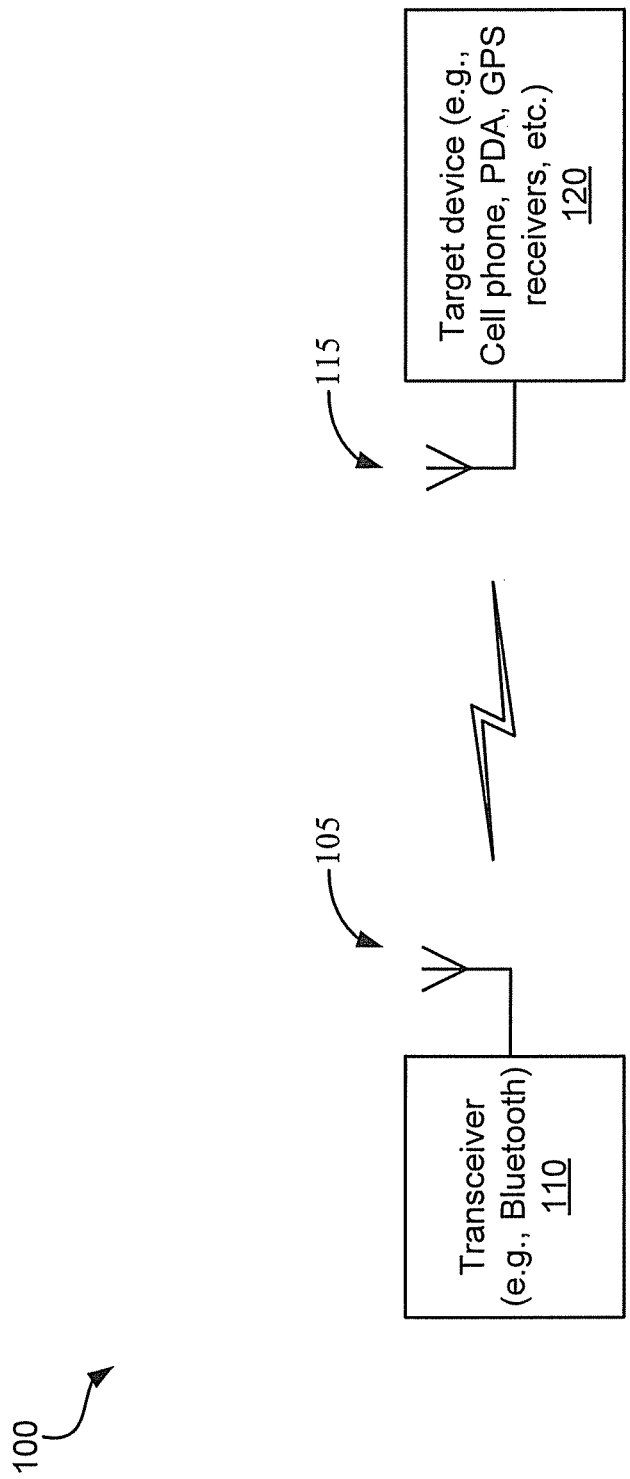
FIG. 1 is a high-level block diagram that illustrates an embodiment of a system that includes a transceiver (e.g., Bluetooth) and a target device.

FIG. 1 is a high-level block diagram that illustrates an embodiment of a system 100 that includes a transceiver (e.g., Bluetooth) 110 and a target device 120. Both the transceiver 110 and target device 120 include antennas 105, 115, respectively, that can receive and transmit radio frequency signals. The transceiver 110 and the target device 120 establish communication using the page procedure and (optionally) the inquiry procedure. The transceiver 110 can be part of, for example, a headset, telephone, modem, networking device, input and output devices for computers, GPS receiver, medical equipment, barcode scanner, controllers for game console, among others. The target device 120 includes, but is not limited to, a cell phone, personal digital assistant (PDA), navigation device, and game console, among others. The transceiver 110 is further described in relation to FIGS. 2 through 6.

Figure 2:
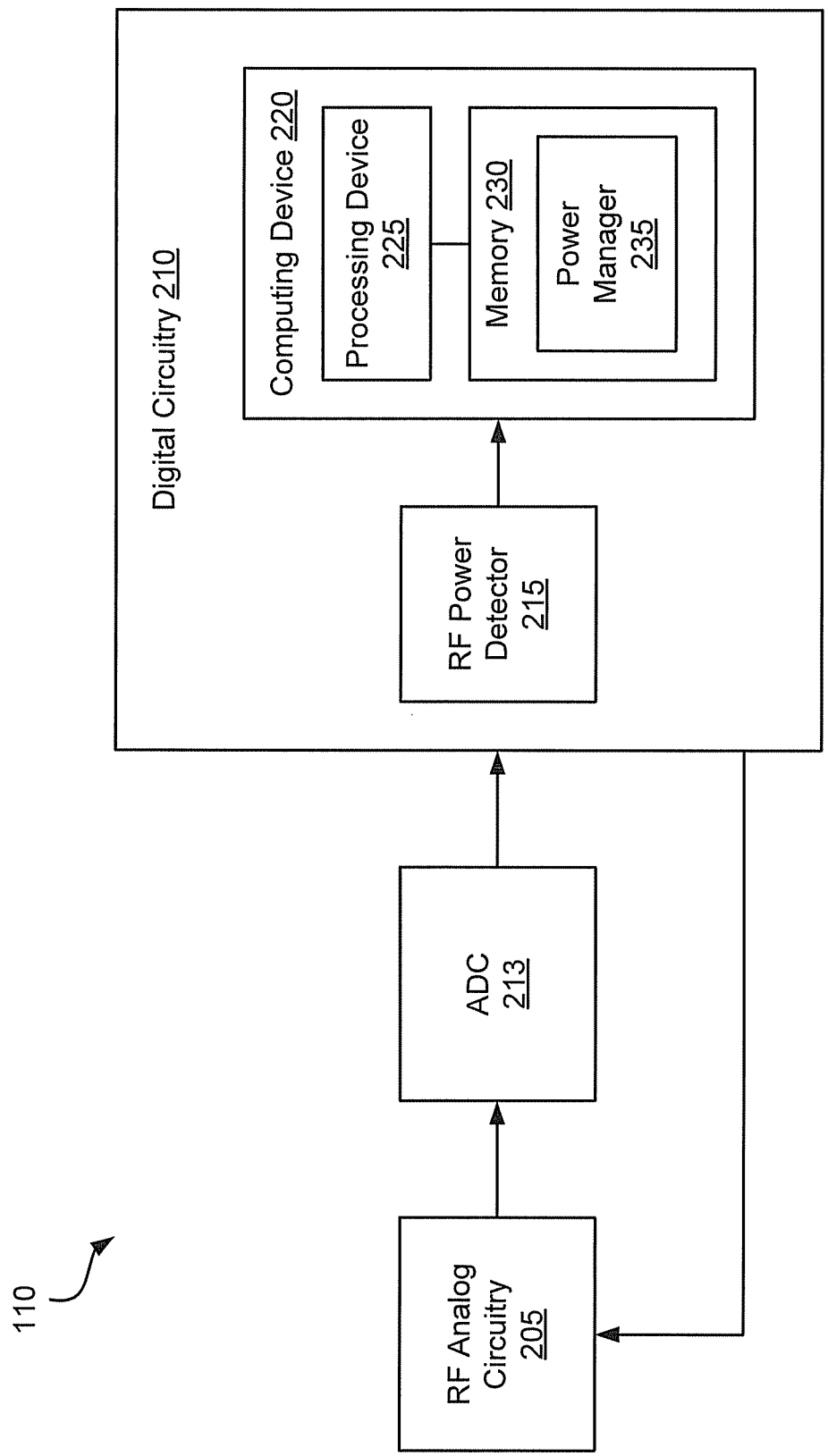
FIG. 2 is a high-level block diagram that illustrates an embodiment of a transceiver, such as that shown in FIG. 1, having a radio frequency (RF) power detector.

FIG. 2 is a high-level block diagram that illustrates an embodiment of a transceiver 110, such as that shown in FIG. 1, having a radio frequency (RF) power detector. The transceiver 110 includes a RF analog circuitry 205 that receives analog RF signals from the antenna 105. The RF analog circuitry 205 processes the analog RF signals from the antenna 105 and sends the processed analog RF signals to an analog to digital converter (ADC) 213 that converts the processed analog RF signals to digital RF signals.

A digital circuitry 210 receives the digital RF signals from the ADC 213. The digital circuitry 210 includes a RF power detector 215 that determines a RF power of the analog RF signals from the antenna 105 based on the digital RF signals from the ADC 213. The digital circuitry 210 further includes a computing device 220 that receives the RF power of the received analog RF signals and can facilitate managing the power consumption of the transceiver 110 based on the RF power.

The computing device 220 includes a processing device 225 and memory 230 having a power manager 235. Such power manager 235 includes instructions that are executed by the processing device 225. The digital circuitry 210 instructs the RF analog circuitry 205 to operate in low current drain RF receiver mode during page scanning and/or inquiry scanning.

The low current drain RF receiver mode should be such that under good signal conditions the power manager 235 can receive the inquiry and/or page messages under the inquiry and/or page scan modes. Under poor signal conditions the low current drain RF receiver mode should be such that the power manager 235 could detect possible inquiry and/or page messages indicating that the transceiver 110 may possibly be receiving the inquiry and/or page messages. If power manager 235 determines that the inquiry and/or page messages are possibly detected a possible, the power manager 235 can switch the transceiver 110 back to a normal receiver mode, with full RF performance, and demodulate a later inquiry and/or page messages.

The digital circuitry 210 further instructs the RF analog circuitry 205 to operate in normal receiver mode based on detecting possible page messages that cannot be demodulated or based on detecting continuous interference contained in the analog RF signals. The digital circuitry 210 can adjust the gain of the RF analog circuitry 205 and detect high input power or continuous interferers in the analog RF signals. The RF power detector 215 facilitates detecting the reply and/or page messages contained in the analog RF signals based on the RF power. The RF power detector 215 further facilitates detecting continuous interference contained in the analog RF signals based on the RF power. The RF power detector 215 is further described in relation to FIGS. 3-4.

Figure 3:
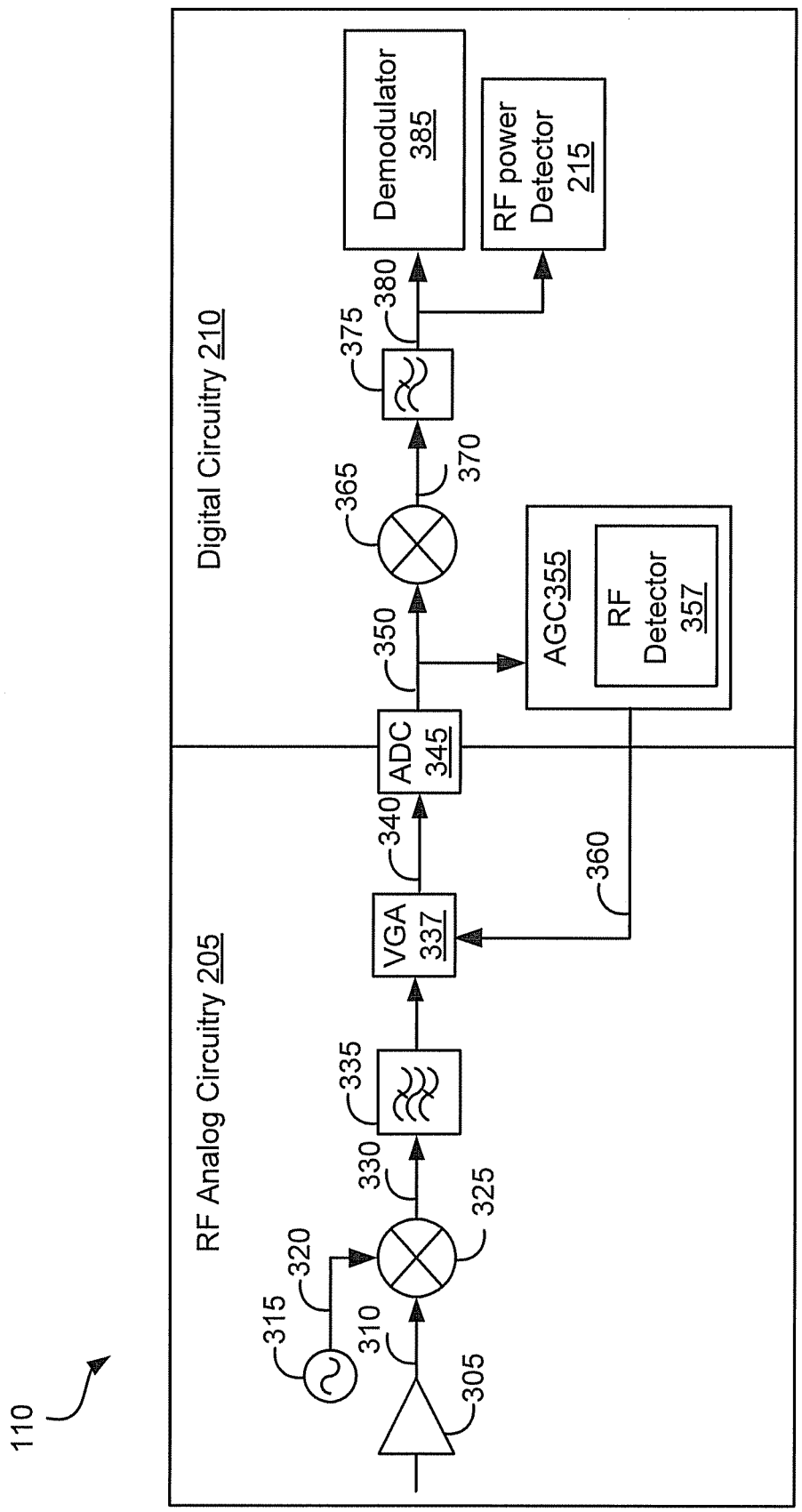
FIG. 3 is a detailed block diagram that illustrates an embodiment of a transceiver, such as that shown in FIG. 2.

FIG. 3 is a detailed block diagram that illustrates an embodiment of a transceiver 110, such as that shown in FIG. 2. In this example, the RF analog circuitry 205 includes a local oscillator 315, amplifier 305, mixer 325, a frequency filter 335 and a variable gain amplifier (VGA) 337. The local oscillator 315 and the amplifier 305 are configured to send predetermined frequency signals and amplify analog RF signals to the mixer 325 via lines 320, 310, respectively. The mixer 325 is configured to mix the predetermined frequency signals and the amplified analog RF signals and send the mixed analog signals via line 330 to the frequency filter 335, which filters the mixed analog signals at a predetermined frequency range. The VGA 337 receives and amplifies the filter analog signals. The ADC 345 receives the filtered amplified signals via line 340 and converts the filtered signals to digital signals.

In this example, the digital circuitry 210 includes an automatic gain control (AGC) 355, mixer 365, frequency filter 375, RF power detector 215, and a demodulator 385. The AGC 355 receives the converted digital RF signals from the ADC 345 via line 350. The AGC 355 includes an AGC RF detector 357 that detects high signal strength of the analog RF signals and/or interference contained in the analog RF signals, both based on the converted digital RF signals. The AGC RF detector 357 can adjust the gain of the RF analog circuitry 205 and detect high input power or continuous interferers in the RF signals based on the converted digital RF signals. In this example, the AGC 335 adjusts the gain of the VGA 337.

The mixer 316 also receives the digital signals via line 350 and mixes the digital signals. The frequency filter 375 is configured to filter the digital RF signals at a predetermined frequency range and sends the filtered digital RF signals to the demodulator 385 and RF power detector 215. The RF power detector 215 is configured to detect low signal strength of the received analog RF signals based on the filtered digital RF signals. The demodulator 385 is configured to receive and demodulate the filtered digital signals.

In the low current drain RF receiver mode for inquiry and/or page scan modes, the power manager 235 (FIG. 2) reduces the power consumption (current reduction) of the RF analog circuitry 205 by "starving" at least some or all the electrical components in the RF analog circuitry 205 to their respective minimal current limits.

Figure 4:
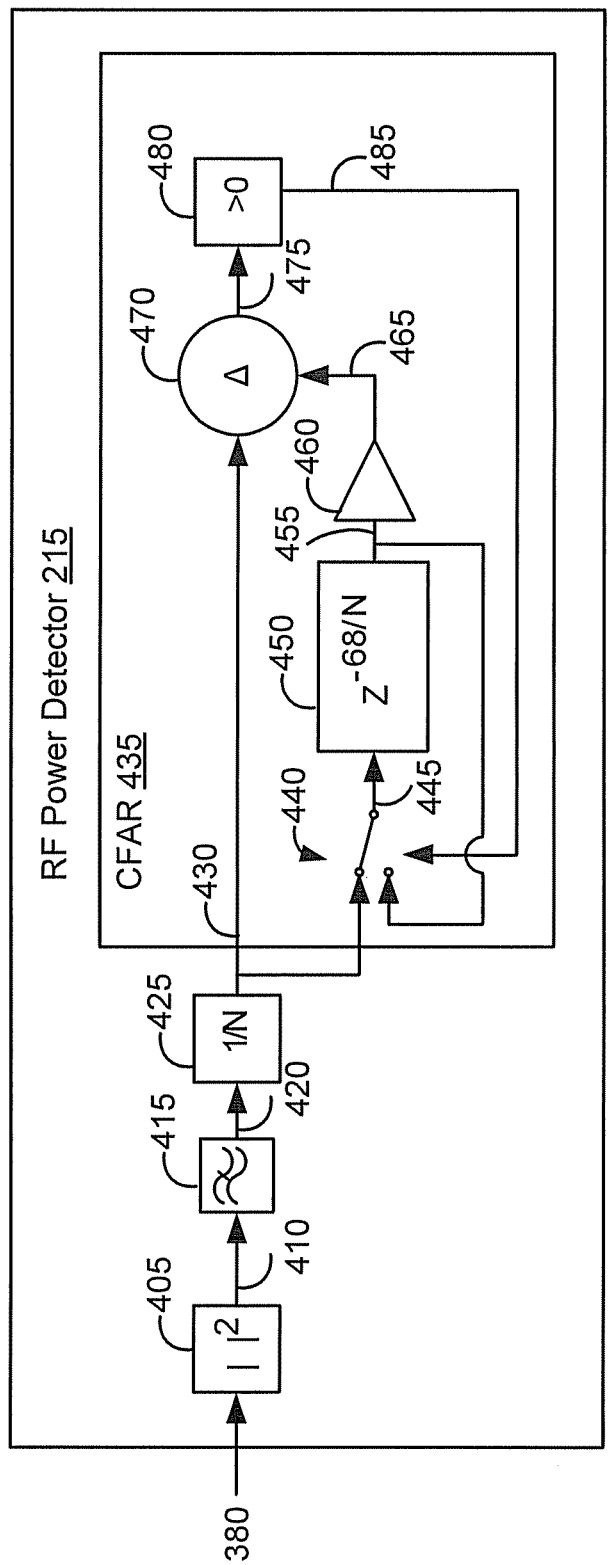
FIG. 4 is a block diagram that illustrates an embodiment of a RF power detector, such as that shown in FIG. 3.

FIG. 4 is a block diagram that illustrates an embodiment of a RF power detector 215, such as that shown in FIG. 3. The RF power detector 215 receives samples of the RF signals at, for example, one megahertz (MHz) sampling rate. The RF power detector 215 can include an absolute value circuitry 405 that receives the sampled RF signals and generates an absolute value indicative of the magnitude of the filtered digital signals via line 380.

The absolute value circuitry 405 sends the absolute value via line 410 to a low pass filter 415, which filters the absolute value. The lower pass filter 415 can remove short bursts of, for example, less than 50 microseconds (μs) in the bandwidth of approximately 10 kilohertz (KHz). A divide-by-Nth device 420 divides the filtered absolute value to decrease the sampling rate of the RF signals and sends delayed sampled RF signals to a constant false alarm rate (CFAR) 435.

The CFAR 435 sets a detection threshold to detect RF signals if the sampled RF signal is greater than the K times the delayed signals. If the detected RF power is above the threshold for at least, e.g., 50 μs and less than, e.g., 100 μs then the CFAR 435 sends data to the power manager 235, which determines that a page message is possibly detected. If the detected RF power is above the threshold for at least, e.g., 50 μs and greater than, e.g., 100 μs then the CFAR 435 sends data to the power manager 235, which determines that a continuous interference is possibly detected.

Figure 5:
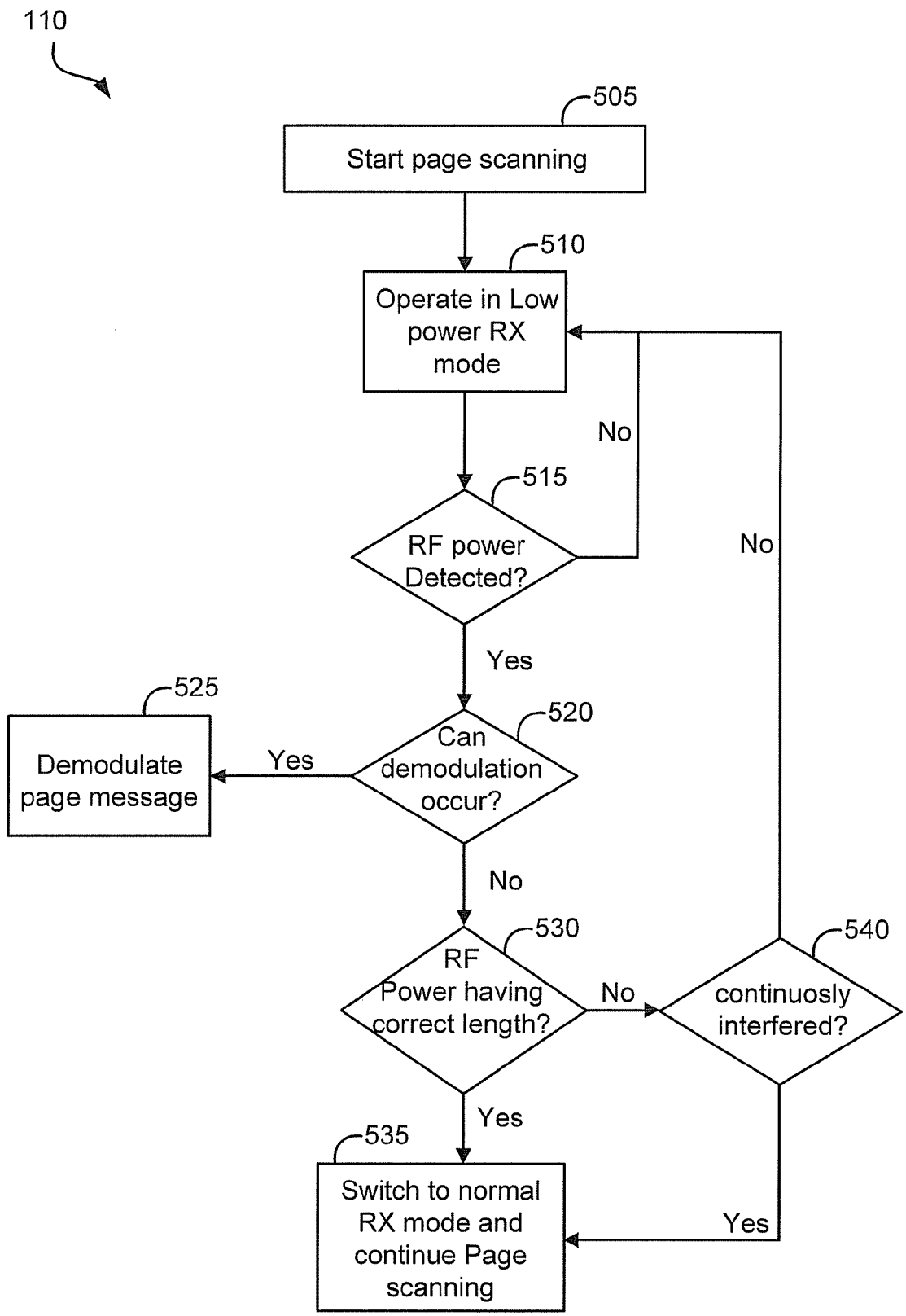
FIG. 5 is a flow diagram that illustrates an embodiment of the architecture, functionality, and/or operation of a power manager, such as that shown in FIG. 2.

FIG. 5 is a flow diagram that illustrates an embodiment of the architecture, functionality, and/or operation of a power manager 235, such as that shown in FIG. 2. Beginning with step 505, the power manager 235 performs page scanning and/or inquiry scanning. In steps 510 and 515, the power manager 235 (FIG. 2) operates the RF analog circuitry 205 (FIG. 2) in low power receiver mode and determines whether the RF power detector 215 (FIG. 2) detected the RF power in the RF signals, respectively. It should be noted that the power manager 235 can receive data related to detected RF power in the RF signals from the AGC RF detector 357 of the AGC 355. Responsive to determining that the RF power was not detected in the RF signals, step 510 is repeated.

In step 520, responsive to detecting the RF power in the received analog RF signals, the power manager 235 demodulates the RF signals and determines whether the RF signals can be demodulated. In step 525, responsive to determining that the RF signals can be demodulated, the power manager 235 configures the transceiver 110 to operate in normal receiver mode and finishes demodulating the RF signals. In step 530, responsive to determining that the RF signals cannot be demodulated, the power manager 235 determines whether the RF power of the RF signals has a correct length.

Responsive to determining that the RF power is a short burst, the power manager 235 in step 540 determines whether the RF signals are continuously interfered based on the RF power. Responsive to determining that the RF signals are not continuously interfered, the power manager 235 continues to operate in low power receiver mode. In other words, the power manager 235 assumes that the short burst of RF power was a false alarm, or some other kind of non persistent interferer, and instructs the transceiver 110 to continue to operate in the low power receiver mode and transmit/search for inquiry/reply/page messages.

In step 535, responsive to determining that the RF signals are continuously interfered and/or that the RF power has the correct length, the power manager 235 configures the transceiver 110 to continue page and/or inquiry scanning and operate in normal receiver mode to improve interference rejection and/or get better performance and wait for the next page attempt, respectively.

Figure 6:
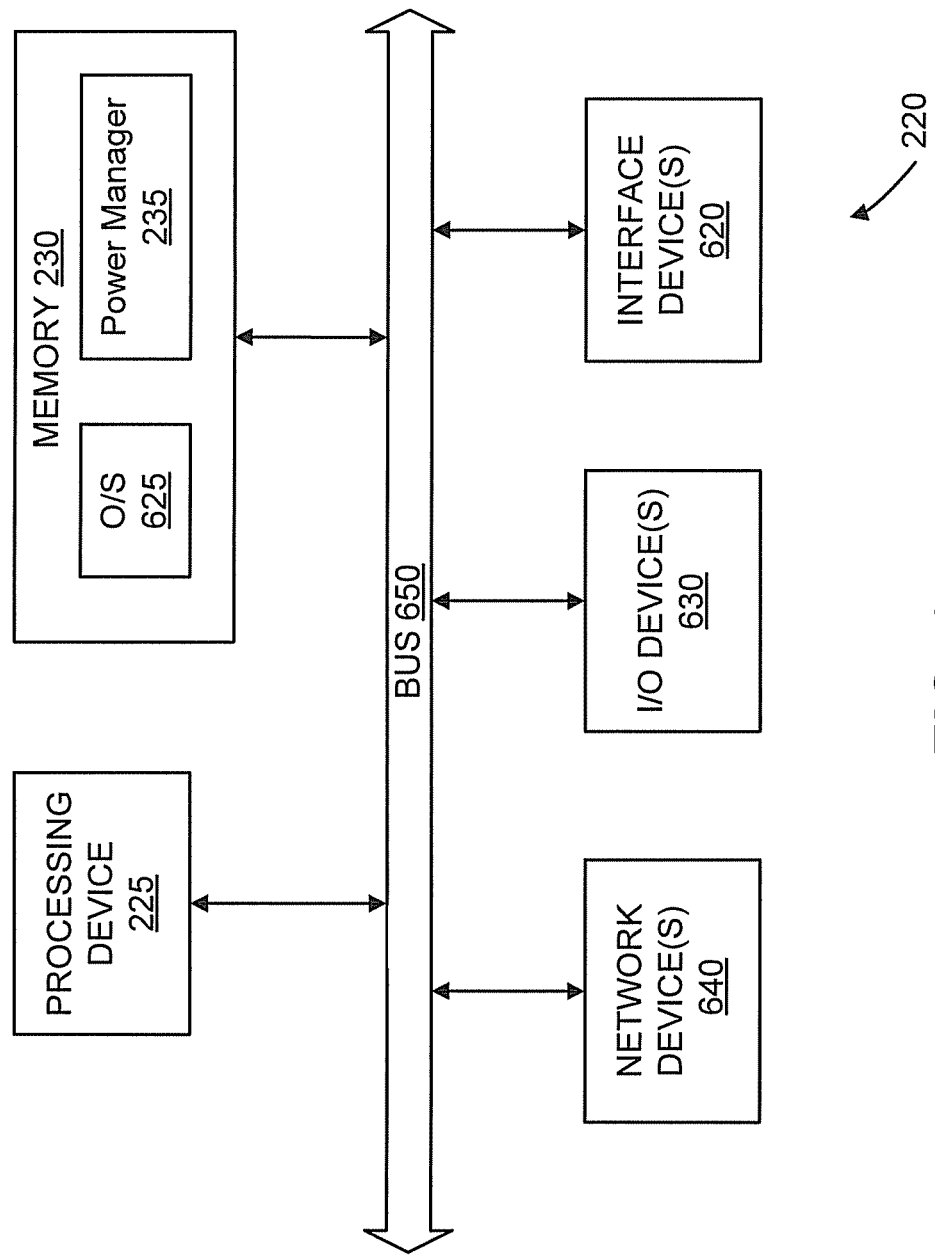
FIG. 6 is a block diagram illustrating an exemplary architecture for a computing device, such as that shown in FIG. 2.

FIG. 6 is a block diagram illustrating an exemplary architecture for a computing device 220, such as that shown in FIG. 5. As indicated in FIG. 6, the computer device 220 comprises a processing device 225, memory 230, one or more user interface devices 620, one or more I/O devices 630, and one or more networking devices 640, each of which is connected to a local interface 650. The processing device 225 can include any custom made or commercially available processor, a central processing unit (CPU) or an auxiliary processor among several processors associated with the computer device 220, a semiconductor based microprocessor (in the form of a microchip), or a macroprocessor. The memory 230 can include any one or a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 620 comprise those components with which the user (e.g., administrator) can interact with the computer device 220. Where the computer device 220 comprises a server computer or similar device, these components can comprise those typically used in conjunction with a PC such as a keyboard and mouse.

The one or more I/O devices 630 comprise components used to facilitate connection of the computer device 220 to other devices and therefore, for instance, comprise one or more serial, parallel, small system interface (SCSI), universal serial bus (USB), or IEEE 1394 (e.g., Firewire™) connection elements. The networking devices 640 comprise the various components used to transmit and/or receive data over networks (not shown), where provided. By way of example, the networking devices 640 include a device that can communicate both inputs and outputs, for instance, a modulator/demodulator (e.g., modem), a radio frequency (RF) or infrared (IR) transceiver, a telephonic interface, a bridge, a router, as well as a network card, etc.

The memory 230 normally comprises various programs (in software and/or firmware) including an operating system (O/S) 625 and a power manager 235. The O/S 625 controls the execution of programs, and provides scheduling, input-output control, file and data management, memory management, and communication control and related services. The power manager 235 includes instructions that are executed by the processing device 225. The instructions of the power manager 235 include logics that are similar to the steps in the flow chart of FIG. 5.

The systems and methods disclosed herein can be implemented in software, hardware, or a combination thereof. In some embodiments, the system and/or method is implemented in software that is stored in a memory and that is executed by a suitable microprocessor (μP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example, but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of the certain embodiments of the present disclosure includes embodying the functionality of the preferred embodiments of the present disclosure in logic embodied in hardware or software-configured mediums.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

Therefore, having thus described the disclosure, at least the following is claimed:

1. A transceiver comprising:
   a RF analog circuitry that receives and processes analog RF signals from an antenna;
   an analog-to-digital converter (ADC) that receives and converts the processed analog RF signals to digital RF signals;
   a digital circuitry that includes a RF power detector that receives the digital RF signals and determines a RF power of the analog RF signals from the antenna based on the digital RF signals; and
   a computing device that receives the RF power of the received analog RF signals and manages the power consumption of the transceiver based on the RF power, wherein the computing device instructs the RF analog circuitry to operate in a page scanning mode and/or an inquiry scanning mode, wherein in the page scanning mode and/or inquiry scanning mode the computing device reduces the power consumption of the RF analog circuitry by reducing current to at least some or all electrical components in the RF analog circuitry to their respective minimal current limits based on the RF power.

2. The transceiver as defined in claim 1, wherein the transceiver is a Bluetooth device.

3. The transceiver as defined in claim 1, wherein the RF power detector facilitates detecting the page messages contained in the analog RF signals based on the RF power.

4. The transceiver as defined in claim 1, wherein the RF power detector facilitates detecting continuous interference contained in the analog RF signals based on the RF power.

5. The transceiver as defined in claim 1, wherein the computing device instructs the RF analog circuitry to operate in normal receiver mode based on detecting possible page messages that cannot be demodulated or based on detecting continuous interference contained in the analog RF signals.

6. The transceiver as defined in claim 1, wherein the RF analog circuitry includes a local oscillator, an amplifier, a mixer, and a frequency filter, the local oscillator and the amplifier being configured to send predetermined frequency signals and amplified analog RF signals to the mixer, respectively, the mixer being configured to mix the predetermined frequency signals and the amplified analog RE signals, and send the mixed analog signals to the frequency filter, which filters the mixed analog signals at a predetermined frequency range.

7. The transceiver as defined in claim 6, wherein the digital circuitry includes a second frequency filter, an automatic gain control (AGC) and a demodulator, the second frequency filter and the AGC being configured to receive the converted digital RF signals from the ADC, the second frequency filter being configured to filter the digital RF signals at a predetermined frequency range, the AGC including a RF detector that detects high signal strength of the analog RF signals and/or interference contained in the analog RF signals, both based on the converted digital signals, the RF power detector being configured to detect low signal strength of the received analog RF signals based on the filtered digital RF signals, the demodulator being configured to receive and demodulate the filtered digital signals.

8. The transceiver as defined in claim 1,
wherein the computing device comprises
a processing device; and
memory including a power manager which has instructions that are executed by the processing device, the instructions including the following steps:
performing inquiry scanning and/or page scanning at the transceiver;
instructing the RF analog circuitry to operate in low current drain RF receiver mode during the page scanning and/or inquiry scanning;
determining whether the RF power in the analog RF signals was detected; and
managing the power consumption of the transceiver during the page scanning and/or inquiry scanning based on the RF power.

9. The transceiver as defined iii claim 8, wherein the instructions further includes the following steps:
responsive to detecting the RF power, demodulating digital RF signals associated with the analog RF signals;
responsive to determining that the digital RF signals can be demodulated, configuring the transceiver to operate in normal receiver mode; and
responsive to determining that the digital RF signals cannot be demodulated, determining whether the RF power has a correct length.

10. The transceiver as defined in claim 9, wherein the instructions further includes the following steps:
responsive to determining that the RF power does not have the correct length, determining whether the analog RF signals are continuously interfered based on the RF power;
responsive to determining that the analog RF signals are continuously interfered, configuring the transceiver to operate in normal receiver mode and continue page scanning and/or inquiry scanning;
responsive to determining that the analog RF signals are not continuously interfered, instructing the transceiver to continue to operate in low power receiver mode; and
responsive to determining that the RF power has the correct length, configuring the transceiver to operate in normal receiver mode and continue page scanning and/or inquiry scanning.

11. A Bluetooth device comprising:
an antenna that receives analog radio frequency (RF) signals;
a RF analog circuitry that receives and processes the analog RF signals from the antenna;
an analog-to-digital converter (ADC) that receives and converts the processed analog RF signals to digital RF signals;
a digital circuitry that includes a RF power detector that receives the digital RF signals and determines a RF power of the analog RF signals from the antenna based on the digital RF signals; and
a computing device that instructs the RF analog circuitry to operate during page scanning and/or inquiry scanning, the computing device being designed to receives the RF power of the received analog RF signals and manages the power consumption of the Bluetooth device based on the RF power, wherein the computing device is designed to reduce current to at least some or all electrical components in the RF analog circuitry to their respective minimal current limits during the page scanning and/or the inquiry scanning based on the RF power.

12. The Bluetooth device as defined in claim 11, wherein the RF power detector facilitates detecting page messages and/or continuous interference contained in the analog RF signals based on the RF power.

13. The Bluetooth device as defined in claim 11, wherein the computing device instructs the RF analog circuitry to operate in normal receiver mode based on detecting possible page messages and/or inquiry messages that cannot be demodulated or based on detecting continuous interference contained in the analog RF signals.

14. The Bluetooth device as defined in claim 11, wherein the RF analog circuitry includes a local oscillator, an amplifier, a mixer, and a frequency filter, the local oscillator and the amplifier being configured to send predetermined frequency signals and amplified analog RF signals to the mixer, respectively, the mixer being configured to mix the predetermined frequency signals and the amplified analog RF signals, and send the mixed analog signals to the frequency filter, which filters the mixed analog signals at a predetermined frequency range.

15. The Bluetooth device as defined in claim 14, wherein the digital circuitry includes a second frequency filter, an automatic gain control (AGC) and a demodulator, the second frequency filter and the AGC being configured to receive the converted digital RF signals from the ADC, the second frequency filter being configured to filter the digital RF signals at a predetermined frequency range, the AGC including a RF detector that detects high signal strength of the analog RF signals and/or interference contained in the analog RF signals, both based on the converted digital RF signals, the RF power detector being configured to detect low signal strength of the received analog RF signals based on the filtered digital RF signals, the demodulator being configured to receive and demodulate the filtered digital signals.

16. A method that is implemented by a processing device, memory having a power manager that includes instructions executed by the processing device, the instructions comprising the following steps:

performing inquiry and/or page scanning at a transceiver;

instructing a radio frequency (RF) analog circuitry to operate in during the page scanning and/or inquiry scanning;

determining whether a RF power in the analog RF signals was detected;

managing the power consumption of the transceiver based on the RF power; and reducing current to at least some or all electrical components in the RF analog circuitry to their respective minimal current limits during the page scanning and/or the inquiry scanning based on the RF power.

17. The method as defined in claim 16, further comprising:

responsive to determining that the RF signals can be demodulated configuring the transceiver to operate in normal receiver mode; and responsive to determining that the digital RF signals cannot be demodulated, determining whether the RF power has a correct length.

18. The method as defined in claim 17, further comprising:

responsive to determining that the RF power does not have the correct length, determining whether the analog RF signals are continuously interfered based on the RF power;

responsive to determining that the analog RF signals are continuously interfered, configuring the transceiver to operate in normal receiver mode and continue page sca and/or inquiry scanning; and responsive to determining that the analog RF signals are not continuously interfered, instructing the transceiver to continue to operate in low power receiver mode; and responsive to determining that the RF power has the correct length, configuring the transceiver to operate in normal receiver mode and continue page scanning and/or inquiry scanning.

* * * * *